United States Patent
Sato et al.

(10) Patent No.: US 7,655,346 B2
(45) Date of Patent: Feb. 2, 2010

(54) ELECTRODE MATERIAL AND FUEL CELL

(75) Inventors: Kazunori Sato, Nagaoka (JP); Yasue Tokutake, Nagano (JP); Michio Horiuchi, Nagano (JP)

(73) Assignee: Shinko Electric Industries Co., Ltd., Nagano (JP)

( * ) Notice: Subject to any disclaimer, the term of this patent is extended or adjusted under 35 U.S.C. 154(b) by 551 days.

(21) Appl. No.: 11/353,734

(22) Filed: Feb. 13, 2006

(65) Prior Publication Data

US 2006/0257718 A1 Nov. 16, 2006

(30) Foreign Application Priority Data

May 12, 2005 (JP) ............... 2005-140285

(51) Int. Cl.
*H01M 4/00* (2006.01)
(52) U.S. Cl. .......................... 429/44; 429/40
(58) Field of Classification Search .............. 429/30, 429/32, 40, 44
See application file for complete search history.

(56) References Cited

U.S. PATENT DOCUMENTS

| | | | |
|---|---|---|---|
| 5,261,944 A | | 11/1993 | Lockhart et al. |
| 7,351,492 B2 * | | 4/2008 | Shimomura et al. ............ 429/44 |
| 2002/0153627 A1 * | | 10/2002 | Ray et al. ....................... 264/13 |
| 2006/0134486 A1 * | | 6/2006 | Horiuchi et al. ................ 429/26 |

FOREIGN PATENT DOCUMENTS

| | | |
|---|---|---|
| JP | 5-255796 | 10/1993 |
| JP | 2004-127761 | 4/2004 |
| JP | 2005-019261 | 1/2005 |
| WO | WO03/098724 | * 11/2003 |

OTHER PUBLICATIONS

Sato et al; Solid-solution effect of the Ni-based cermet on the electrochemical oxidation of methane; Proceedings— Electrochemical Society (2003); 695-703; ISSN 0161-637.*

* cited by examiner

*Primary Examiner*—Patrick Ryan
*Assistant Examiner*—Muhammad Siddiquee
(74) *Attorney, Agent, or Firm*—Locke Lord Bissell & Liddell LLP (57) ABSTRACT

A fuel cell electrode material comprising a cermet which comprises metal particles consisting of cobalt and nickel and electrolyte particles consisting of solid oxides, wherein the metal particles comprise 20 to 90 mol % cobalt and the residue of nickel in terms of CoO and NiO, respectively, and a solid oxide fuel cell battery comprising a fuel cell which comprises a solid electrolyte base, a fuel electrode formed on a fuel compartment side of the base, and an air electrode formed on an air compartment side of the base, wherein the fuel electrode is formed from the electrode material of the present invention.

8 Claims, 8 Drawing Sheets

BEFORE REDUCTION    AFTER REDUCTION

Fig.5

BEFORE REDUCTION    AFTER REDUCTION

ELECTRODE MATERIAL AND FUEL CELL

BACKGROUND OF THE INVENTION

1. Field of the Invention

The present invention relates to an electrode material that can be advantageously used as a fuel electrode in a fuel cell, and a fuel cell battery using a fuel electrode formed from such an electrode material. The fuel cell battery of the present invention not only can achieve higher fuel electrode performance than a conventional fuel cell battery using a nickel cermet as a fuel electrode, but also can effectively generate electricity without pre-reforming or humidifying a fuel, when methane and other gases are used as the fuel.

2. Description of the Related Art

Heretofore, fuel cells have been developed and commercially implemented as low-pollution power generating means to replace traditional power generating means such as thermal power generation, or as electric energy sources for electric vehicles that replace traditional engine-driven vehicles using gasoline or the like as a fuel. Especially, in recent years, much research work has been done for the development of higher-efficiency, higher-performance, and lower-cost fuel cells.

As is well known, there are various types of fuel cells, distinguished by the method of power generation. Among the well-known types of fuel cells, the type of fuel cell that uses a solid electrolyte, that is, the solid oxide fuel cell (SOFC), is attracting attention in various technical fields because of its potential to achieve the highest power generation efficiency and because the life can be extended and the cost reduced. In one example of such a solid oxide fuel cell, a calcined body formed from yttria($Y_2O_3$)-doped stabilized zirconia is used as an oxygen ion conducting solid electrolyte layer. This fuel cell comprises an air electrode (cathode layer) formed on one side of the solid electrolyte layer and a fuel electrode (anode layer) on the opposite side thereof. The fuel cell comprising the solid electrolyte layer, the anode layer, and the cathode layer is housed in a chamber to complete a fuel cell battery. Power can be generated by supplying an oxygen or oxygen-containing gas to the cathode layer side of the fuel cell and a fuel gas such as methane to the anode layer side of the fuel cell. In this fuel cell battery, the oxygen ($O_2$) supplied to the cathode layer is converted into oxygen ions ($O^{2-}$) at the boundary between the cathode layer and the solid electrolyte layer, and the oxygen ions are conducted through the solid electrolyte layer into the anode layer where the ions react with the fuel gas, for example, a methane gas ($CH_4$), supplied to the anode layer, producing water ($H_2O$) and carbon dioxide ($CO_2$) as final products. In this reaction process, a potential difference occurs between the cathode layer and the anode layer. Here, when the cathode layer and the anode layer are electrically connected by a lead wire, the electrons in the anode layer flow toward the cathode layer via the lead wire, and the fuel cell thus generates electrical power.

Various improvements have been made in the above type of fuel cell and in other types of fuel cell in order to increase power generating efficiency, etc. For example, Japanese Unexamined Patent Publication (Kokai) No. 5-255796 describes a nickel cermet that can be advantageously used as a fuel electrode and, in particular, in a solid oxide fuel cell, and a method of manufacturing the same. The nickel cermet described in this patent document consists essentially of 35 to 70% by weight of a metal nickel phase and 65 to 30% by weight of a zirconia phase stabilized in the cubic form with yttria, and the two phases are distinctly and homogeneously distributed at a level lower than 1 μm, the dispersion of nickel in percentage being 0.2 to 2.0 and the specific surface area being 2 to 12 $m^2/g$ (nickel) and 1 to 4 $m^2/g$ (cermet).

Fuel cells using a nickel cermet as a fuel electrode are also proposed in recent years. For example, Japanese Unexamined Patent Publication (Kokai) No. 2004-127761 describes a fuel electrode for a solid oxide fuel cell wherein the fuel electrode is formed by compounding mother particles of metal oxides such as NiO (nickel oxide), CoO (cobalt oxide), etc. with child particles of oxygen ion conducting ceramic materials such as YSZ (yttria-stabilized zirconia), PSZ (partially stabilized zirconia), etc. and by calcining the resulting composite powder.

On the other hand, Japanese Unexamined Patent Publication (Kokai) No. 2005-19261 describes a fuel electrode for a solid oxide fuel cell wherein the fuel electrode is formed by calcining a powder mixture prepared by mixing fine zirconia powders whose 50 percent has a particle size within the range of 0.4 to 0.8 μm, coarse zirconia powders whose 50 percent has a particle size within the range of 25 to 50 μm, and nickel oxide powders whose 50 percent has a particle size of larger than 2 μm but smaller than 5 μm.

However, fuel cells using a nickel cermet as a fuel electrode have unsolved problems. For example, when a methane gas is used as the fuel, if the fuel electrode is formed from a nickel cermet, there arises not only the problem that high fuel electrode performance cannot be achieved because the activity of the fuel electrode is relatively low, but also the problem that carbon precipitates on the surface of the fuel electrode. Further, in fuel cells, usually, a noble metal such as platinum is used as a catalyst in order to enhance performance. However, as platinum, for example, is a limited resource and is expensive, it is desired to develop a fuel electrode that does not use such a noble metal catalyst.

SUMMARY OF THE INVENTION

It is an object of the present invention to provide an electrode material for use in a fuel cell that can achieve high fuel electrode performance in various types of fuel cells, and that can effectively generate an electricity without requiring such processing as fuel pre-reforming or fuel humidification even when a hydrocarbon gas such as a methane gas is used as the fuel, and a high-performance fuel cell battery that uses such an electrode material.

It is another object of the present invention to provide an electrode material that can avoid the problem of fuel carbonization and adhesion without having to use an expensive material such as a platinum-group metal, and a high-performance fuel cell battery that uses such an electrode material.

It is yet another object of the present invention to provide an electrode material that can eliminate the problem of fuel electrode overvoltage by improving the activity for the direct oxidation of a methane gas, etc., and a high-performance fuel cell battery that uses such an electrode material.

After conducting vigorous studies in order to achieve the above objects, the inventors of this application have discovered that, in a nickel cermet commonly used as a fuel electrode for a solid oxide fuel cell, it is effective to add a significant amount of cobalt, and have completed the present invention.

That is, in one aspect, the present invention provides a fuel cell electrode material comprising a cermet which comprises metal particles consisting of cobalt and nickel and electrolyte particles consisting of solid oxides, wherein the metal particles comprise 20 to 90 mol % cobalt and the residue of nickel in terms of CoO and NiO, respectively.

In another aspect, the present invention provides a solid oxide fuel cell battery comprising a fuel cell which comprises a solid electrolyte base, a fuel electrode formed on a fuel compartment side of the base, and an air electrode formed on an air compartment side of the base, wherein the fuel electrode is formed from the electrode material of the present invention.

As will be understood from the detailed description given hereinafter, according to the present invention, even in the case of a fuel cell battery having a well-known and conventional structure, high fuel electrode performance can be achieved by using the electrode material of the present invention and, besides, electricity can be generated efficiently without requiring such processing as fuel pre-reforming or fuel humidification even when a hydrocarbon gas such as a methane gas is used as the fuel and accordingly, a higher-performance fuel cell battery can be provided. The fuel cell battery of the present invention not only has excellent power generation efficiency, but can also achieve extended life and contribute to reductions in cost and size.

Further, the electrode material of the present invention has the feature of being able not only to avoid the problem of fuel carbonization and adhesion in the fuel cell battery, but also to eliminate the use of an expensive metal such as a platinum-group metal in the manufacturing of the fuel cell battery.

Furthermore, the electrode material of the present invention has the feature of being able to improve the activity for the direct oxidation of a methane gas, etc. and to reduce fuel electrode overvoltage.

Moreover, according to the present invention, by constructing the fuel cell battery in the form of a fuel cell battery unit and by accommodating two or more fuel cell battery units into one casing, a small, compact, and yet higher-output fuel cell battery can be provided by effectively utilizing the space within the fuel cell battery.

For example, in the case of a single-chamber type fuel cell battery that uses a fuel gas mixture, by accommodating a plurality of fuel cells in the form of a fuel cell stack in the chamber, a higher voltage can be produced than would be the case if a single fuel cell were accommodated in the chamber.

DESCRIPTION OF THE PREFERRED EMBODIMENTS

The fuel cell electrode material according to the present invention can be advantageously used for forming a fuel electrode (anode layer) in various types of fuel cell. The electrode material of the invention is particularly advantageous for use for forming the fuel electrode of a solid oxide fuel cell. Accordingly, the electrode material and the fuel cell battery according to the present invention will be described below with reference to preferred embodiments thereof by taking, among others, a solid oxide fuel cell battery as an example. However, it will be appreciated that the present invention is not limited to the solid oxide fuel cell battery described herein.

The solid oxide fuel cell battery of the present invention, like generally known fuel cell batteries, can be produced with different constitutions. The types of solid oxide fuel cell battery preferred for carrying out the present invention include, but are not limited to, the direct-flame type in which the fuel cell is placed so that its fuel electrode directly contacts a flame generated by the combustion of a fuel such as a solid fuel, a liquid fuel, or a gaseous fuel and generates electricity by the heat and the fuel species in the flame, and the single-chamber type in which the fuel cell is placed in an atmosphere of a fuel gas mixture comprising a gaseous fuel and an oxygen or oxygen-containing gas, and generates electricity, based on the potential difference caused between the fuel electrode and the air electrode. Such fuel cells are typically classified into flat-plate type, cylindrical type, segment type, etc. The cylindrical type cell can be further classified into two types, i.e., the cylindrical vertical stripe type and the cylindrical horizontal stripe type. That is, in the practice of the present invention, the fuel cell battery can be constructed in various constitutions including those already known in publications, etc. and those currently implemented in practice.

Basically, the solid oxide fuel cell battery of the present invention, like fuel cell batteries generally known in the art, can be constructed to include a fuel cell comprising a solid electrolyte base, a fuel electrode formed on the fuel compartment side of the base, and an air electrode formed on the air compartment side of the base, and various changes and modifications can be made, as desired, without departing from the scope of the invention. However, as will be described in detail below, it is essential that, in the fuel cell battery of the present invention, the fuel electrode be formed from the electrode material of the present invention.

In the practice of the present invention, the solid electrolyte base of the fuel cell can be made in various forms. The base is typically made in the form of a flat plate or in the form of a film, a membrane, or a coating. The material of the solid electrolyte base is not specifically limited, and includes, for example, the following materials known in the art.

a) YSZ (yttria-stabilized zirconia), ScSZ (scandia-stabilized zirconia), and zirconia-based ceramics comprising these zirconias doped with Ce, Al, etc.

b) SDC (samaria-doped ceria), SGC (gadolinium-doped ceria), and other ceria-based ceramics.

c) LSGM (lanthanum gallate), for example, $La_{0.9}Sr_{0.1}Ga_{0.8}Mg_{0.2}O_3$, and bismuth oxide-based ceramics, for example, $Bi_2O_3$.

The solid electrolyte base may be formed as a self-supporting type in which the base itself has the function of supporting the fuel electrode and the air electrode, or as a non-self-supporting type in which the solid electrolyte base is supported by the fuel electrode, etc. When the non-self-supporting type is employed, there is no need to form the solid electrolyte base as a thick structure, nor is it necessary to use a flat plate-like solid electrolyte base. Accordingly, the thickness of the solid electrolyte base can be changed over a wide range, typically from about 10 to 500 μm, and preferably from about 20 to 50 μm. When making the solid electrolyte base particularly thin, usually an electrolyte supporting structure is employed.

The solid electrolyte base can be formed using any suitable technique commonly employed for the formation of a membrane, a film, etc., for example, a green sheet process. For example, a paste as a solid electrolyte material is applied in a desired pattern and dried to form a green sheet, and after that, the green sheet is calcined at high temperature. In this way, the solid electrolyte base can be formed easily. To apply the paste, a printing technique such as screen printing can be used advantageously. More specifically, the solid electrolyte base can be formed by printing the paste of the solid electrolyte material in a desired pattern, for example, on a flat plate-like provisional support, followed by drying and calcination. The calcination temperature can be changed over a wide range according to the characteristics, etc. of the solid electrolyte material used, but usually it is within the range of about 900 to 1500° C.

In the practice of the present invention, the air electrode (cathode layer) is not limited to any specific material, but can be formed from an electrode material commonly used for fuel cells. Suitable materials for the air electrode include, but not restricted to, manganic acid or cobalt acid compounds of the third group element of the periodic table such as lanthanum having added thereto strontium (Sr), for example, lanthanum strontium manganite, lanthanum strontium cobaltite, samarium strontium cobaltite and the like.

The air electrode is formed as a porous body so that air or oxygen can be sufficiently dispersed through the interior of it but that sufficient electrical conductivity can be maintained. The porosity of the air electrode can be changed as desired but, usually, a porosity of about 10 to 60% is preferable. Further, when the solid electrolyte base is formed as a relatively thin film, a structure for supporting the air electrode by a supporting member such as a conductive mesh may be employed. When the air electrode is supported by a conductive mesh, its thermal shock resistance increases, and cracking due to abrupt temperature changes can be prevented.

Further, the thickness of the air electrode can be changed as desired, but usually the thickness is within the range of about 20 to 200 μm, and preferably about 30 to 120 μm. If the air electrode is too thin, the intended function of the air electrode cannot be obtained, causing such problems as a decrease in output as a result of insufficient cathode reaction.

The air electrode can be formed using any suitable technique commonly employed for the formation of a membrane, a film, etc. For example, a paste for forming the air electrode is applied in a desired pattern on the surface of the already formed solid electrolyte base, and is calcined after drying. In this way, the air electrode can be formed easily. To apply the paste, a printing technique such as screen printing can be used advantageously. The calcination temperature can be changed over a wide range according to the characteristics, etc. of the air electrode material used, but usually it is within the range of about 900 to 1500° C. Of course, if necessary, the air electrode may be formed using other suitable techniques.

In the fuel cell battery of the present invention, the fuel electrode (anode layer) is formed from a specific electrode material. The fuel electrode material of the present invention is a nickel cermet comprising nickel as a first component and cobalt as a second component added in an amount substantially equal to the amount of the first component. More specifically, the fuel electrode material of the present invention comprises a cermet which comprises metal particles consisting of cobalt and nickel and electrolyte particles consisting of solid oxides, wherein the metal particles comprise 20 to 90 mol % cobalt and 80 to 10 mol % nickel in terms of CoO and NiO, respectively. If the cobalt content is lower than 20 mol % or higher than 90 mol %, the unique effect associated with the fuel electrode of the present invention may not be achieved. In particular, when the cobalt content is higher than 90 mol %, there may also arise the delamination problem of fuel electrode.

In the thus formed fuel electrode, the electrolyte particles constituting part of the electrode material can be formed from solid oxides commonly used for the formation of a fuel electrode. Especially, ceria-based ceramics, zirconia-based ceramics, etc. are preferred for use. If necessary, a mixture of two or more kinds of such ceramics may be used. More specifically, the ceramics preferred for use for the formation of the fuel electrode include, but are not limited to, samarium-doped ceria-based ceramics, gadolinium-doped ceria-based ceramics, yttrium-stabilized zirconia-based ceramics, scandium-stabilized zirconia-based ceramics, or a mixture thereof.

Further, in the electrode material of the present invention, it is preferable that the cobalt and nickel used in the formation of the metal particles be contained in an amount of about 10 to 70% by weight based on the total amount of the electrode material (cermet) when these metals are contained in oxidized forms, i.e., CoO and NiO. More preferably, the metal particle content is within the range of about 30 to 70% by weight. If the cobalt and nickel content is outside this range, the unique effect associated with the fuel electrode of the present invention may not be achieved.

In one specific example, the cermet which contains metal particles consisting of cobalt and nickel and electrolyte particles consisting of solid oxides, and whose cobalt and nickel content satisfies the above range, is a combination of nickel and a ceria-based ceramic, such as $CeO_2$ doped with 20 mol % $Sm_2O_3$ or $CeO_2$ doped with 10 mol % $Gd_2O_3$, or a zirconia-based ceramic, such as $ZrO_2$ stabilized with 8 mol % $Y_2O_3$ or $Zr_2O_3$ stabilized with 10 mol % $Sc_2O_3$, wherein the nickel content is about 40 to 70% by volume. In these and other cermets used in the present invention, a noble metal such as ruthenium (Ru), rhodium (Rh), or platinum (Pt) may be dispersed as needed. Further, in a special case, copper (Cu) may be used instead of nickel, if an effect and an advantage equivalent to nickel can be expected.

Further, in the electrode material of the present invention, preferably, the cobalt and nickel constituting the metal particles are completely solid-dissolved in the electrode material, at least under the reduced conditions. That is, when the electrode material is formed as a single alloy, the unique effect associated with the fuel electrode of the present invention is reliably achieved.

Also preferably, the electrolyte particles contained in the electrode material has a smaller particle size than the metal particles. When the electrolyte particles and the metal particles are contained in the electrode material to satisfy this condition, the interstices formed between the two kinds of particles can contribute to enhancing the fuel electrode performance.

In addition, it is preferable that the electrode material of the present invention exhibit an adsorption ability of the order of 0.1 to $10 \times 10^{-6}$ mol/m$^2$ for each of methane, carbon monoxide, and hydrogen gases when the adsorption ability for each gas is expressed by the formula: the number of adsorbed molecules (mol)/the unit area (m$^2$) of the porous body. If the adsorption ability of the electrode material is lower than $0.1 \times 10^{-6}$ mol/m$^2$, there arises the problem that the activity for the oxidation reaction at the fuel electrode drops. Conversely, if it is higher than $10'10^{-6}$ mol/m$^2$, there arises the problem that the reactant becomes difficult to desorb from the electrode, rendering the electrode reaction inactive.

The fuel electrode is formed in a porous body so that molecules, etc. of fuel can be sufficiently dispersed through the interior of it and yet, sufficient electrical conductivity can be maintained. The porosity of the fuel electrode can be changed as desired, but usually a porosity of about 10 to 60% is preferable. Further, when the solid electrolyte base is formed as a relatively thin film, a structure for supporting the fuel electrode by a supporting member such as a conductive mesh may be employed. When the fuel electrode is supported by a conductive mesh, its thermal shock resistance increases, and cracking due to abrupt temperature changes can be prevented.

Further, the thickness of the fuel electrode can be changed as desired, but usually the thickness is within the range of about 20 to 200 μm, and preferably about 30 to 120 μm. If the fuel electrode is too thin, the intended function of the fuel electrode cannot be obtained.

The fuel electrode can be formed using any suitable technique commonly used for the formation of a membrane, a film, etc. For example, a paste as an electrode material is applied in a desired pattern on the surface of the already formed solid electrolyte base, and is calcined after drying. In this way, the fuel electrode can be formed easily. To apply the paste, a printing technique such as screen printing can be used advantageously. The calcination temperature can be changed over a wide range according to the characteristics, etc. of the electrode material used, but usually it is within the range of about 900 to 1500° C. Of course, if necessary, the fuel electrode may be formed using other suitable techniques.

In the fuel cell of the present invention, the air electrode and the fuel electrode can be formed on the respective surfaces of the already formed solid electrolyte base, for example, as described above but, if necessary, the fuel cell may be formed in a different order. For example, after the air electrode forming paste is printed in a desired pattern and is dried as needed, the solid electrolyte base forming paste is printed in a desired pattern on the surface of the air electrode and is dried as needed, and thereafter, the fuel electrode forming paste is printed in a desired pattern on the surface of the solid electrolyte base and is dried as needed. Finally, the uncalcined structure comprising the air electrode, the solid electrolyte base, and the fuel electrode is calcined. This green sheet process is effective in shortening the fabrication process of the fuel cell.

The fuel cell having the above structure can be constructed in various forms to implement the fuel cell battery of the present invention. For example, the fuel cell may be constructed from a single member or from a combination of two or more smaller members (parts). More specifically, in one preferred embodiment of the present invention, the fuel cell can be constructed from a single cell member which comprises a fuel electrode and an air electrode. The structure and fabrication of the fuel cell constructed from a single cell member may be easily understood from the description given above.

In another preferred embodiment of the present invention, the fuel cell can be constructed from a plurality of segment cell members each comprising a solid electrolyte base, a fuel electrode, and an air electrode. In this embodiment, the individual cell members are arranged in a vertical or horizontal direction or in vertical and horizontal directions. In the case of such a fuel cell, the segment cell members are electrically connected in series or in parallel to complete the intended fuel cell.

In the practice of the present invention, the configuration where the plurality of segment cell members arranged adjacent to one another are connected in series or in parallel can be implemented advantageously in various ways. For example, the conductive mesh attached to the air electrode of one segment cell member and the conductive mesh attached to the fuel electrode of another segment cell member adjacent to that one segment cell member can be advantageously connected together via a conductive mesh disposed extending across the gap between the segment cell members. The conductive mesh used as the connecting means here may be the conductive mesh of the air electrode, or the conductive mesh of the fuel electrode, or a third conductive mesh different from either of the two conductive meshes. Any joining method that suits the conductive mesh material, etc. can be used to connect the conductive meshes together. For example, when the conductive meshes are formed from metal meshes, spot welding can be used advantageously. Of course, if necessary, other material than the conductive mesh may be used as the connecting means.

As described above, the fuel cell having the above structure can be used in various types of fuel cell battery. When using the above fuel cell in a single-chamber type fuel cell battery in which the fuel cell is placed in an atmosphere of a fuel gas mixture containing a gaseous fuel and an oxygen or oxygen-containing gas and generates an electricity based on the potential difference caused between the fuel electrode and the air electrode, it is preferable that a plurality of such fuel cells be stacked together and housed in a single chamber in the form of a multilayered cell structure, and that each air electrode is directly joined to each adjacent fuel electrode.

Further, in the fuel cell battery, it is preferable that the fuel cells be housed in the chamber with the air electrode and fuel electrode of each fuel cell oriented parallel to the flow direction of the fuel gas mixture, that the air electrode and the fuel electrode be each formed as a porous layer having numerous microscopic pores which enable the fuel gas mixture to pass through, and that the solid electrolyte base have a closely compacted structure which substantially blocks the flow of the fuel gas mixture.

Alternatively, in the fuel cell battery, it is preferable that the fuel cells be housed in the chamber with the air electrode and fuel electrode of each fuel cell oriented perpendicularly to the flow direction of the fuel gas mixture, and that the air electrode, the fuel electrode, and the solid electrolyte base be each formed as a porous layer having numerous microscopic pores which enable the fuel gas mixture to pass through.

Further, in the fuel cell battery comprising the fuel cells stacked in multiple layers as described above, it is advantageous to make provisions to prevent the explosion of the fuel gas mixture by adding fillers into the space in the chamber other than the space occupied by the fuel cells stacked in multiple layers, with a suitable gap provided between the fillers so that even if the fuel gas mixture within the ignitability limit is present, the fuel gas mixture will not ignite. That is, in a fuel cell battery comprising fuel cells housed in a chamber formed with inlet and outlet ports through which a fuel gas mixture, containing oxygen and a fuel gas such as a methane gas, is introduced and the exhaust gas is ejected, it is preferable that fillers be added into the space in the chamber where the fuel gas mixture and the exhaust gas flow, i.e., the space in the chamber other than the space occupied by the fuel cells, and that a suitable gap be provided between the fillers so that when the fuel cell battery is operated, the fuel gas mixture will not ignite even if the fuel gas mixture within the ignitability limit is present in that space. Suitable materials for the fillers include, for example, pulverized powders, porous bodies, or capillaries formed from a metal material or ceramic material stable under the operating conditions of the fuel cell battery.

Further, in this fuel cell battery, a desired high voltage can be produced by using the plurality of fuel cells stacked in multiple layers with each air electrode directly joined to each adjacent fuel electrode. Further, in the case where the fuel cells stacked in multiple layers are arranged in the chamber with the air electrode and fuel electrode of each fuel cell oriented parallel to the flow direction of the fuel gas mixture, the air electrode and the fuel electrode can each be formed as a porous layer having numerous microscopic pores which enable the fuel gas mixture to pass through, while the solid electrolyte base can be formed in a closely compacted structure which substantially blocks the flow of the fuel gas mixture. On the other hand, in the case where the fuel cells stacked in multiple layers are arranged with the air electrode and fuel electrode of each fuel cell oriented perpendicularly to the flow direction of the fuel gas mixture, then the air electrode, the fuel electrode, and the solid electrolyte base can each be formed as a porous layer having numerous microscopic pores which enable the fuel gas mixture to pass through; in this case, since the fuel gas mixture can pass through the multilayered fuel cell structure, there is no need to form a separate passage.

In addition, the fuel cell battery of the present invention may be constructed from a single fuel cell battery unit, or from two or more fuel cell battery units each capable of functioning as the fuel cell battery of the present invention. In particular, in the fuel cell battery of the present invention, by combining two or more fuel cell battery units, an increase in output, etc. can be easily achieved with the predetermined battery size.

When constructing the fuel cell battery of the present invention from a combination of a plurality of fuel cell battery units, the fuel cell battery can be implemented in various combinations. For example, the plurality of fuel cell battery units can be arranged side by side within a single casing. The plurality of fuel cell battery units to be combined for use may be identical in shape, structure, and size, or may be different in shape, structure, and size. Of course, if desired, various fuel cell battery units may be combined in a desired manner and may be arranged in a desired pattern. Here, the example of using the plurality of fuel cell battery units by housing them in a casing is only one example, and it will be appreciated that the fuel cell battery units may be used in other ways, for example, the fuel cell battery units may be used by fixing them onto a common substrate.

The fuel cell battery of the present invention achieves excellent power generation efficiency, extended life, and cost reduction, and can therefore be manufactured advantageously in various fields. For example, the fuel cell battery of the present invention can be used advantageously in such fields as automotive power generation, industrial power generation, and home power generation. Further, by reducing the size, the fuel cell battery can be used advantageously, for example, for lighting LEDs or for driving LCDs, portable radios, portable information apparatuses, etc.

The structure and other features of the fuel cell battery of the present invention may be fully understood from the above description. For reference, one example of a fuel/oxidant separator type fuel cell battery will be described with reference to FIG. 1. Note that the illustrated fuel cell battery is only one example, and as will be easily understood by those skilled in the art, its structure, dimensions, etc. can be changed in various ways without departing from the scope of the invention. The description of the materials preferred for use for forming the members constituting the fuel cell battery has already be given above, and will not be repeated here.

Figure 1:
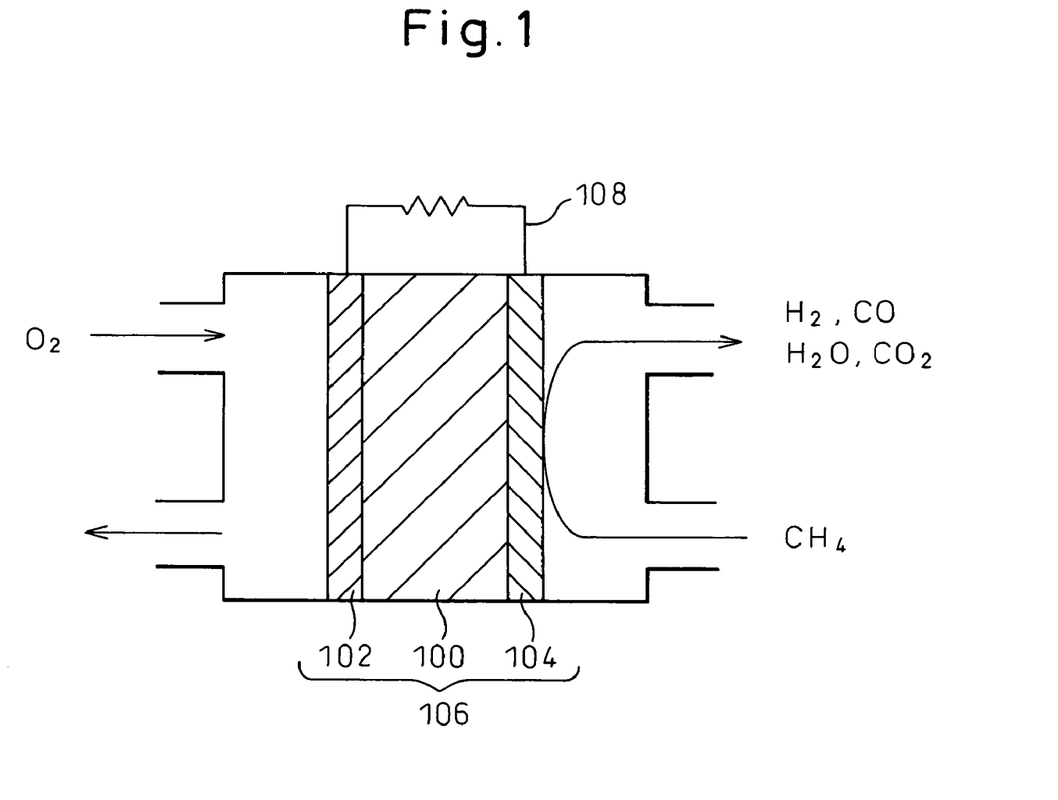
FIG. 1 is a cross-sectional view showing one preferred embodiment of a fuel cell battery according to the present invention.

As illustrated, in the fuel cell battery, a calcined structure made of yttria($Y_2O_3$)-doped stabilized zirconia is used as the oxygen ion conducting solid electrolyte base 100. In the fuel cell 106, the air electrode 102 is formed on one principal surface side of the solid electrolyte base 100, while the fuel electrode 104 according to the present invention is formed on the other principal surface side of the solid electrolyte base 100. An oxygen or oxygen-containing gas is supplied to a side of the air electrode 102 of the fuel cell 106, and a fuel gas such as methane is supplied to a side of the fuel electrode 104.

The oxygen ($O_2$) supplied to the air electrode 102 side of the fuel cell 106 illustrated in FIG. 1 is converted into oxygen ions ($O^{2-}$) at the interface between the air electrode 102 and the solid electrolyte base 100, and the oxygen ions ($O_2$) are conducted through the solid electrolyte base 100 into the fuel electrode 104. The oxygen ions ($O_2$) conducted into the fuel electrode 104 react with the methane gas ($CH_4$) supplied to the fuel electrode 104, producing water ($H_2O$), carbon dioxide ($CO_2$), hydrogen ($H_2$), and carbon monoxide (CO). During this reaction process, the oxygen ions release electrons, and a potential difference therefore occurs between the air electrode 102 and the fuel electrode 104. Therefore, when the air electrode 102 and the fuel electrode 104 are electrically connected by a lead wire 108, the electrons in the fuel electrode 104 flow in the direction of the air electrode 102 via the lead wire 108, and the fuel cell can thus generate electricity. The operating temperature of the illustrated fuel cell is about 1000° C.

EXAMPLES

The present invention will be further described with reference to working examples thereof.

Example 1

A solid oxide fuel cell battery having a fuel electrode formed from a cermet $Ni_{1-x}Co_x$-SDC consisting of a nickel-cobalt alloy (No—Co) and SDC (samaria-doped ceria) was fabricated. For comparison purposes, a conventional solid electrolyte fuel cell having a fuel electrode formed from a nickel cermet Ni-SDC with no cobalt was also fabricated.

First, $Ni_{1-x}Co_xO$ (in the formula, x is 0, 0.25, 0.5, or 0.75) was prepared in the form of a solid solution. $Co_3O_4$ powder and NiO powder in amounts necessary to obtain the respective compositions were mixed in an alumina crucible and were caused to react at 1000° C. for 10 hours in the atmosphere, and the resulting product was pulverized. The thus produced powders were again mixed in the crucible, and the resulting product was placed in a calcining furnace and was caused to react at 1000° C. for 10 hours in the atmosphere. When the thus prepared powders were subjected to X-ray diffraction analysis (XRD), it was confirmed that the $Ni_{1-x}Co_xO$ solid solution was obtained with the respective powders having the intended compositions. Further, it was observed by means of an electron probe micro analyzer (EPMA) that impurities from the crucible were not contained in the solid solution.

Next, 40% by weight of SDC ($Ce_{0.8}Sm_{0.2}O_{1.9}$) powder was added to the $Ni_{1-x}Co_xO$ solid solution powder prepared as described above, and was kneaded using an ethylcellulose-based binder (STD-100, manufactured by Dow Chemical). A paste for forming the fuel electrode was thus obtained.

On the other hand, ethanol, dibutyl phthalate, and polyvinyl butyral were added to SDC ($Ce_{0.8}Sm_{0.2}O_{1.9}$) powder, and the resulting product was ground by a ball mill and then formed into a green sheet. The green sheet thus formed was punched in the shape of a circular disk, after which the disk was placed in a calcining furnace and calcined at 1300° C. for five hours in the atmosphere. The SDC disk thus obtained was about 15 mm in diameter and about 0.3 mm in thickness.

After making the SDC disk as described above, the fuel electrode forming paste prepared in the earlier process was screen-printed on one side of the disk, and the resulting disk was placed in the calcining furnace and calcined at about 1300° C. for five hours in the atmosphere. Here, when printing the paste, a platinum mesh (#100, 3 mm×3 mm) to which a platinum lead wire with a diameter of 0.3 mm was attached was embedded to form a current collecting means. The fuel electrode having a final thickness of about 50 μm was thus formed.

Next, using a paste prepared by mixing SSC (samarium strontium cobaltite: $Sm_{0.5}Sr_{0.5}CoO_3$) with SDC ($Ce_{0.8}Sm_{0.2}O_{1.9}$) (mixing ratio: 70% by weight to 30% by weight), an air electrode was formed on the side of the SDC disk opposite to the side thereof on which the fuel electrode was already formed. After screen-printing the mixture paste, the disk was placed in the calcining furnace and calcined at about 1200° C. for five hours in the atmosphere. Here, when printing the paste, a platinum mesh (#100, 3 mm×3 mm) to which a platinum lead wire with a diameter of 0.3 mm was attached was embedded to form a current collecting means. The air electrode having a final thickness of about 50 μm was thus formed.

For reduction of the $Ni_{1-x}Co_x$ particles of the fuel electrode, the resulting fuel cell (fuel electrode: $Ni_{1-x}Co_x$-SDC, solid electrolyte base: SDC, air electrode: SSC-SDC) was held at about 700° C. for one hour in a dry hydrogen atmosphere. Next, the fuel cell was place between two cylindrically-shaped double tube made of alumina (thickness: 2 mm, outer diameter: 15 mm) and was sealed with glass. Cylindrically-shaped solid oxide fuel cell batteries having fuel electrodes of different compositions were thus obtained.

Example 2

The fuel cell batteries fabricated in the foregoing example 1 were used as samples, and oxygen was supplied to the air electrode at a flow rate of $2 \times 10^{-5}$ $m^3$/min, while dry methane ($CH_4$) diluted with helium in a volume ratio of 1:9 was supplied as a fuel gas to the fuel electrode at a flow rate of $2 \times 10^{-5}$ $m^3$/min. Power generation experiments were conducted at about 600 to 700° C. for the following items.

[Comparison of Discharge Performance for Methane]

Figure 2:
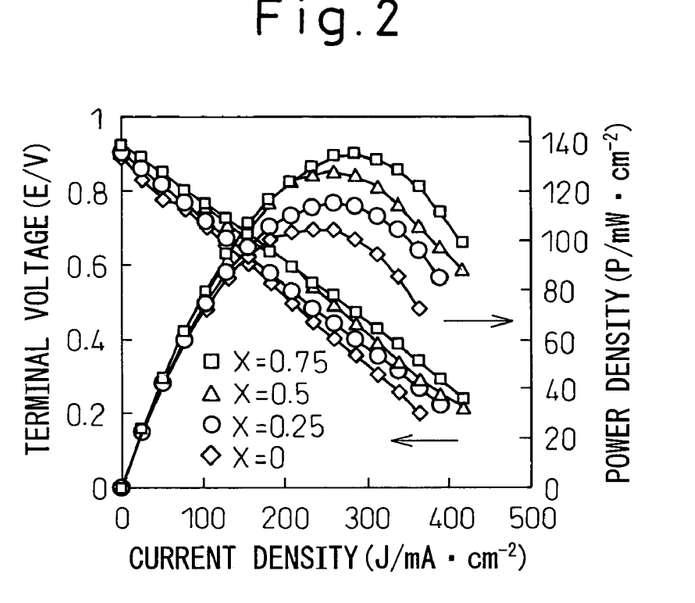
FIG. 2 is a graph showing a comparison of the performance of fuel electrodes for methane.

When open circuit voltage (terminal voltage) and output density (power density) were measured on each fuel cell sample while increasing the current density, measurement results plotted in FIG. 2 were obtained. As can be seen from the current density-voltage curves plotted in FIG. 2, when $Ni_{1-x}Co_x$-SDC was used for the fuel electrode, the terminal voltage was 0.85 V or higher on any sample, and the power density increased with increasing amount of Co (x), the power density being the highest in the case of the fuel electrode of x=0.75, i.e., as high as about 160 mW/$cm^{-2}$, compared with the fuel electrode of x=0 (conventional nickel cermet with no cobalt) which achieved about 100 mW/$cm^{-2}$ at best. From these and other measurement results, it can be deduced that the amount of Co (x) within the range of 20 to 90 mol % is preferable for $Ni_{1-x}Co_x$-SDC. In the case of a fuel cell having a fuel electrode of x=1 (fuel electrode formed from 100% CoO powder without using NiO powder) fabricated for the purpose of reference, electrode delamination easily occurred, and power generation performance could not be evaluated.

[Comparison of Fuel Electrode Overvoltage (Proportional to Reaction Resistance) for Methane]

Figure 3:
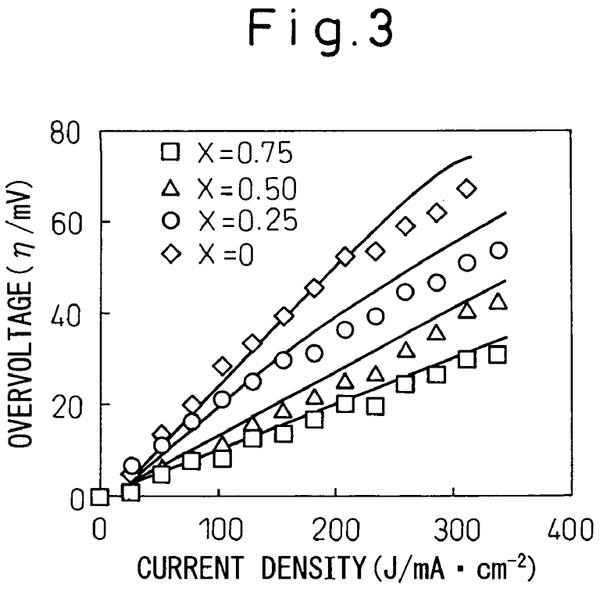
FIG. 3 is a graph showing a comparison of the overvoltage of fuel electrodes for methane.

When overvoltage was measured on each fuel cell sample by a current interruption method while increasing the current density, the measurement results plotted in FIG. 3 were obtained. As can be seen from the current density-overvoltage curves plotted in FIG. 3, when $Ni_{1-x}Co_x$-SDC was used for the fuel electrode, in any sample there is a tendency for the overvoltage to increase with increasing current density, but the overvoltage can be reduced by increasing the amount of Co (x). The reduction of the overvoltage means an improvement in cell performance.

[Microscopic Porous Structure of $Ni_{1-x}Co_x$ Particles]

Figure 4:
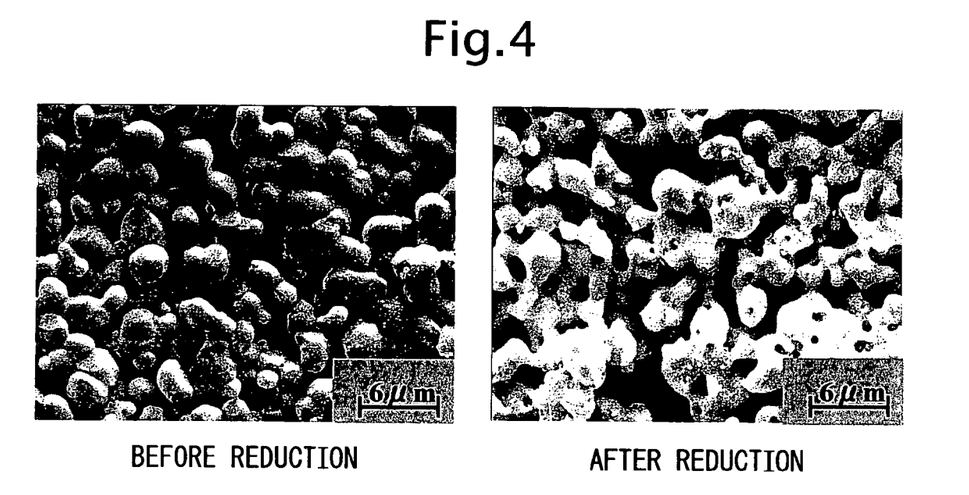
FIG. 4 is a set of SEM micrographs showing the porous body of $Ni_{1-x}Co_x$ particles (x=0) and the grain growth caused by reduction.
Figure 5:
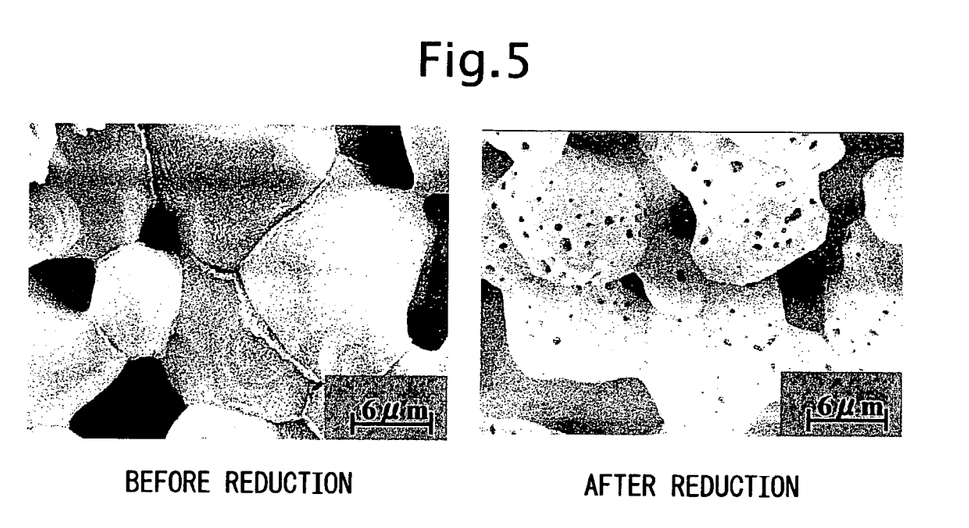
FIG. 5 is a set of SEM micrographs showing the porous body of $Ni_{1-x}Co_x$ particles (x=0.75) and the remarkable grain growth caused by reduction.

When the microscopic structure of the $Ni_{1-x}Co_x$ particles in the $Ni_{1-x}Co_x$-SDC used for the fuel electrode was observed under a scanning electron microscope (SEM), significant grain growth was identified in the metal particles as the amount of Co (x) increased. The grain growth of the metal particles became further pronounced when reduction was performed.

FIGS. 4 and 5 are SEM micrographs showing the microscopic porous structure observed on the surfaces of the $Ni_{1-x}Co_x$ particles (FIG. 4: x=0, FIG. 5: x=0.75) and the pronounced grain growth caused by reduction. Before taking these SEM micrographs, a slurry of $Ni_{1-x}Co_xO$ powder was applied to the surface of the SDC disk in accordance with the method described in the foregoing example 1, and the thus prepared disk was calcined at about 1300° C. for five hours in air and was thereafter held at about 700° C. for two hours in a dry hydrogen atmosphere. As can be seen from the SEM micrographs, sintered $Ni_{0.25}Co_{0.75}$ particles (FIG. 5) show a larger particle size and more pronounced grain growth than the NiO particles (FIG. 4), and the many open pores formed between the particles are also larger; as a result, the adsorption ability relatively drops. It can be deduced here that effective electrode performance can be achieved by suitably adjusting the adsorption power of the fuel electrode for the fuel species, since too strong or too weak an adsorption power would lead to undesirable results.

[Microscopic Porous Structure of $Ni_{1-x}Co_x$-SDC Particles]

Figure 6:
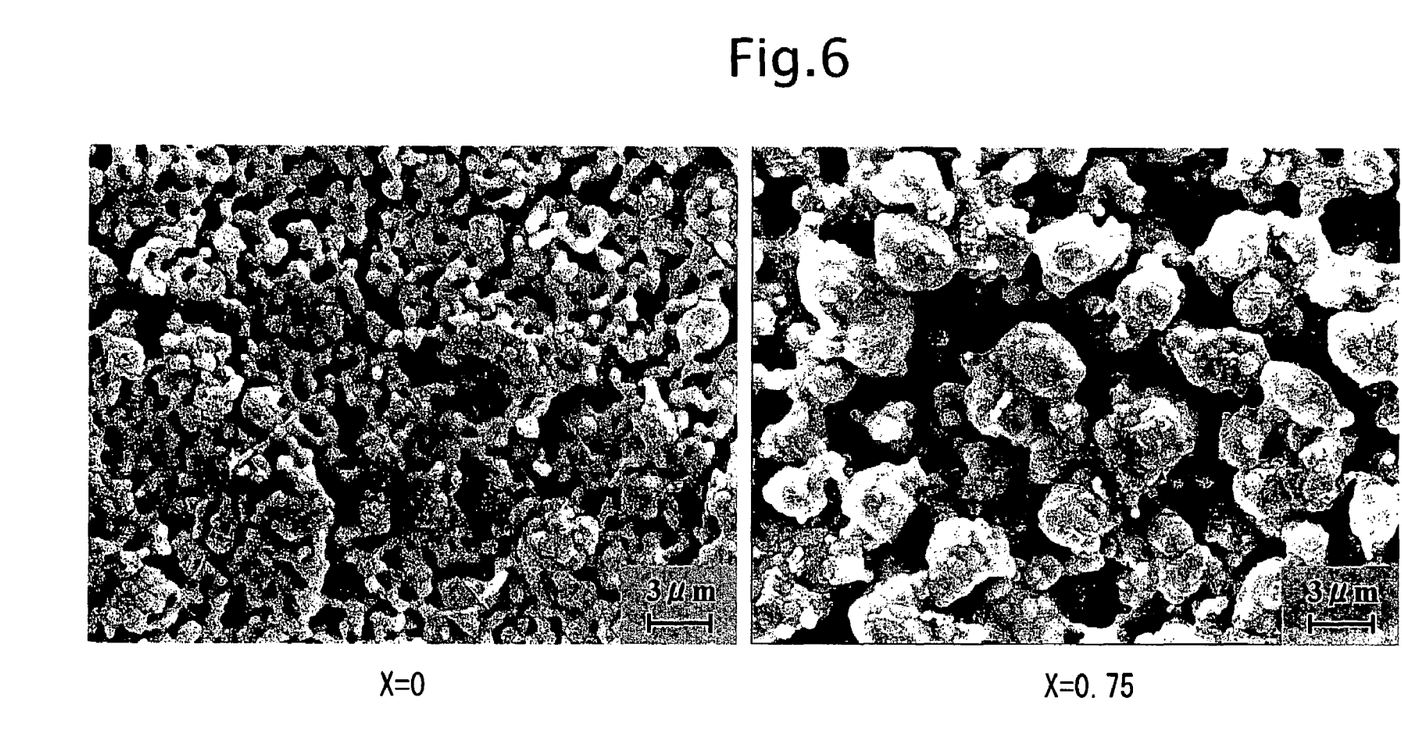
FIG. 6 is a set of SEM micrographs showing the porous structure of $Ni_{1-x}Co_x$-SDC particles (x=0 and x=0.75)

When the microscopic structure of the $Ni_{1-x}Co_x$-SDC particles in the $Ni_{1-x}Co_x$-SDC used for the fuel electrode was observed under a scanning electron microscope (SEM), significant grain growth was identified in both the metal particles and the SDC particles as the amount of Co (x) increased. In fact, it was confirmed that the metal particles, which were smaller in size than the SDC particles when x=0, grew larger than the SDC particles when x=0.25 or larger.

FIG. 6 is a set of SEM micrographs (magnification: ×10,000) showing the microscopic porous structure observed on the surfaces of the $Ni_{1-x}Co_x$-SDC particles (x=0 and x=0.75). Before taking these SEM micrographs, the paste prepared by mixing the $Ni_{1-x}Co_x$ powder with the SDC powder was screen-printed on the surface of the SDC disk in accordance with the method described in the foregoing example 1, and the thus prepared disk was placed in a calcining furnace and calcined at about 1300° C. for five hours in the atmosphere. As can be seen from the SEM micrographs, sintered $Ni_{0.25}Co_{0.75}$-SDC particles (micrograph at right in the figure) have a larger particle size and larger open pores than the NiO-SDC particles (micrograph at left in the figure). Further, small white particles in the $Ni_{0.25}Co_{0.75}$-SDC particles were identified as SDC particles; it can be seen that grain growth takes place in both the $Ni_{0.25}Co_{0.75}$ particles and the SDC particles as the amount of Co (x) increases. Further, in the case of this cell, a decrease in the interfacial resistance between the NiCo-SDC fuel electrode and the SDC electrolyte was observed, which proved that the cell performance improved.

[X-Ray Diffraction Diagram of $Ni_{1-x}Co_x$-SDC Particles]

Figure 7:
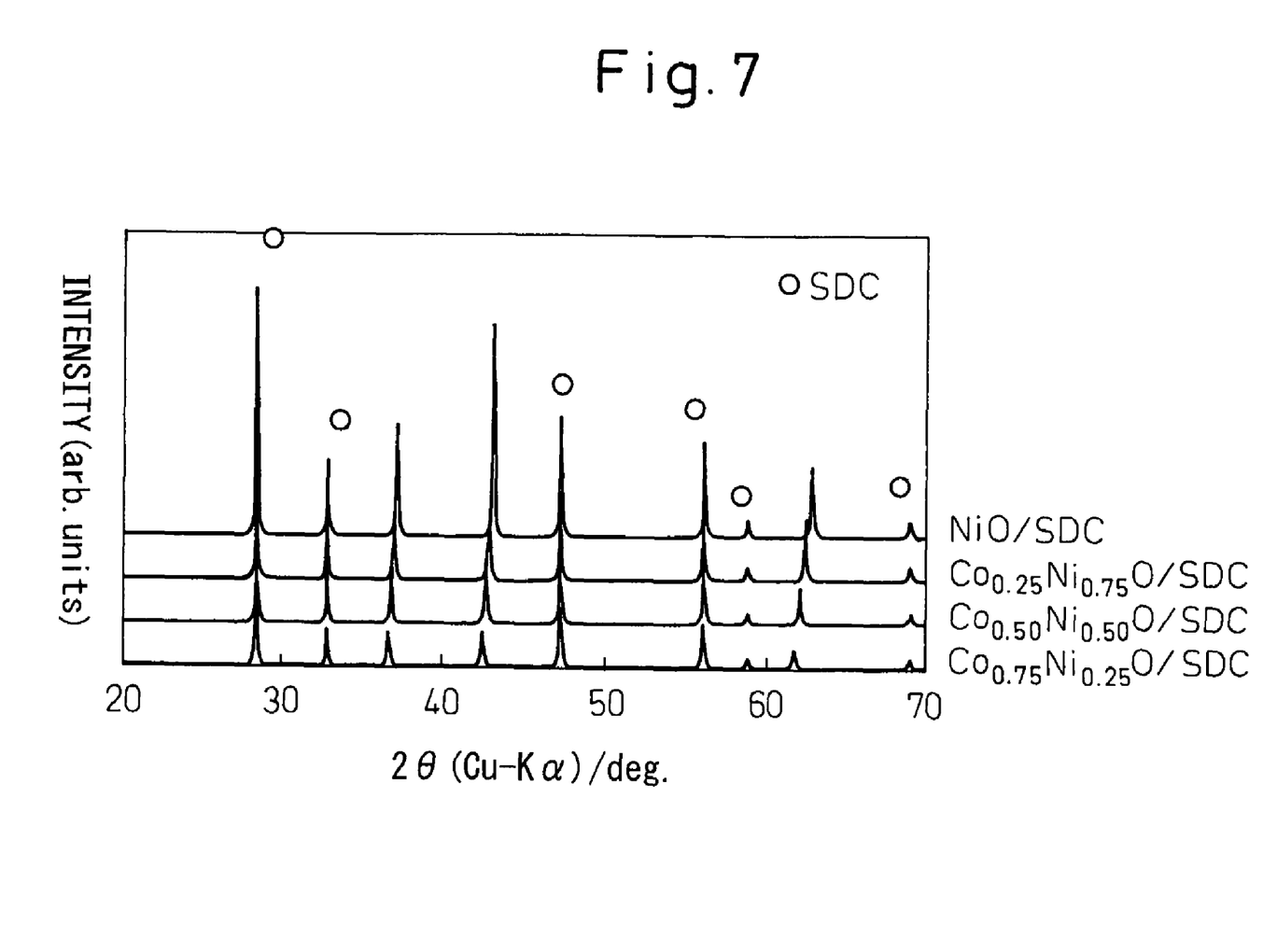
FIG. 7 is an X-ray diffraction diagram of $Ni_{1-x}Co_x$-SDC particles of different compositions.

When $Ni_{1-x}Co_x$-SDC particles of different compositions (x=0, 0.25, 0.5, or 0.75) were measured by X-ray diffraction, an X-ray diffraction diagram plotted in FIG. 7 was obtained. As can be seen from this X-ray diffraction diagram, in each composition, nickel and cobalt are completely solid-solutioned to form a single alloy.

[Evaluation of Adsorption Power by Temperature-Programmed Desorption (TPD) Analysis]

For $Ni_{1-x}Co_x$-SDC particles of different compositions (x=0, 0.5, or 0.75), the adsorption ability when methane was used as the fuel was evaluated by TPD (temperature-programmed desorption) analysis. The TPD analysis was performed as described below.

The temperature was raised while passing a carrier gas (helium) into a flow-through container (cell) containing NiCo-SDC particles as a sample to be measured, and gas molecules chemisorbed on the surfaces of the sample were desorbed into the carrier gas. The desorption gas was measured by an adsorption measuring apparatus. Next, after accurately metering a sample of about 200 mg, the sample was filled into a flow-through quartz cell for TPD measurement. After degassing the cell, the adsorption gas (methane) was passed at room temperature for two minutes, causing the methane gas to be adsorbed on the surfaces of the sample. After that, to desorb the physically adsorbed gasses, the sample was held at about 100° C. for 30 minutes while flowing a helium gas. Next, while passing the helium gas, the sample was heated from room temperature up to about 700° C. by increasing the temperature at a rate of 10° C./min. Using a thermal conductivity detector (TCD), the amount of desorbed gas was measured in terms of signal intensity (mV).

Figure 8:
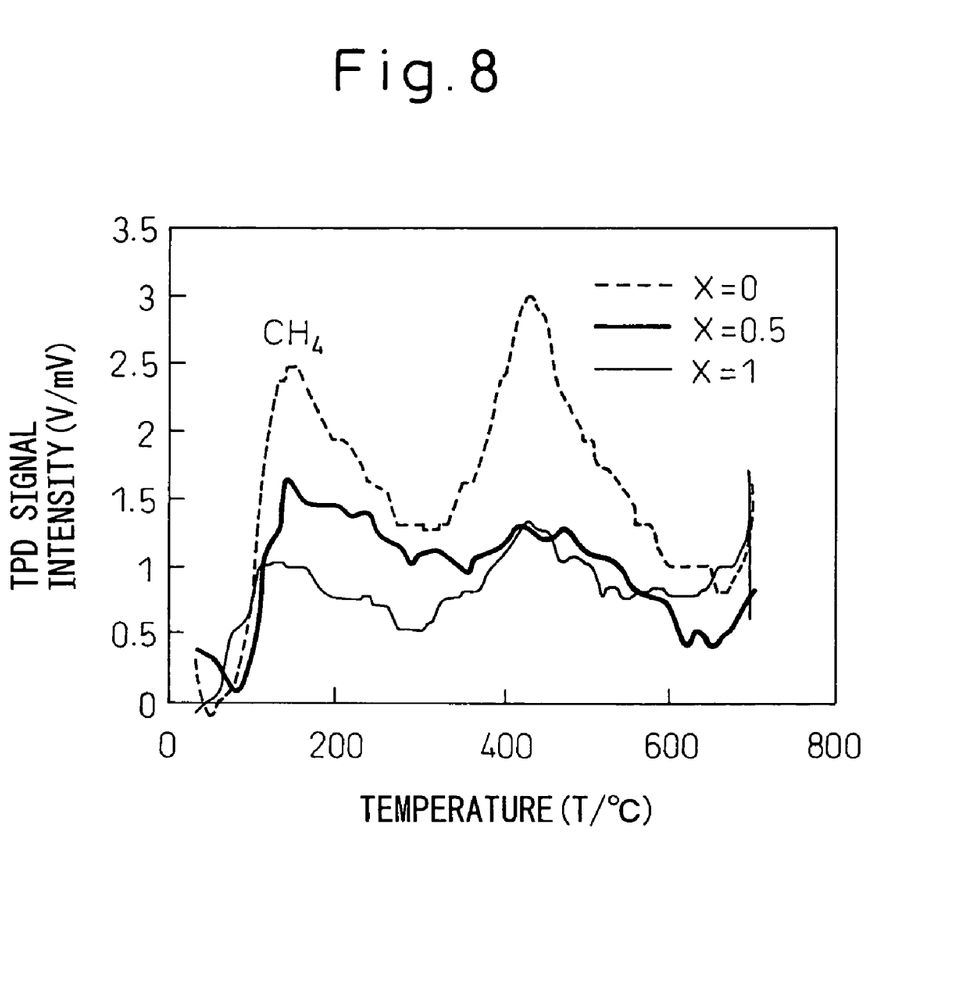
FIG. 8 is a TPD spectrum diagram of $Ni_{1-x}Co_x$-SDC particles of different compositions.

FIG. 8 is a TPD spectrum diagram plotting the obtained results. Desorption peaks were observed at 180° C. and 420° C., regardless of the amount of Co (x), but the desorption peak area decreased with increasing amount of Co (x). As a result, as shown in FIG. 8, the adsorption ability for methane and the signal intensity (mV) decreased with increasing amount of Co (x).

From the results of the above experiments, the following conclusions, for example, can be obtained.

(1) Cell performance for methane fuels can be improved by adding Co atoms to the fuel electrode made of Ni-based SDC cermet.

(2) Overvoltage at the fuel electrode can be reduced since the interfacial resistance between the NiCo-SDC fuel electrode and the SDC electrolyte can be reduced.

(3) The increased amount of Co in the $Ni_{1-x}Co_xO$ phase used as the starting material greatly contributes to the grain growth in both the $Ni_{1-x}Co_xO$ particles and the SDC particles.

Example 3

In this example, power generation experiments were conducted by repeating the method described in the foregoing example 2, with the difference that (1) hydrogen humidified by adding 3% by volume of vapor or (2) carbon monoxide (CO) was used as the fuel, instead of methane. The supply flow rate of hydrogen or carbon monoxide was set to $2 \times 10^{-5}$ $m^3$/min., i.e., the same flow rate as that employed for methane. For all evaluation items, satisfactory evaluation results were obtained, as in the case of methane. Some of the experimental results are shown below.

[Comparison of Discharge Performance for Hydrogen]

Figure 9:
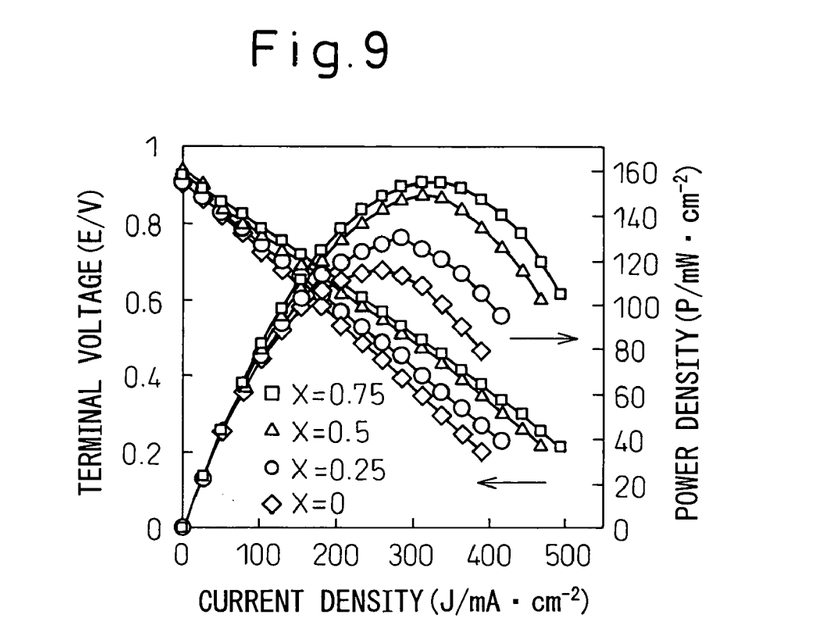
FIG. 9 is a graph showing a comparison of the discharging performance of fuel electrodes for hydrogen.

When the terminal voltage and the power density were measured on each fuel cell sample while increasing the current density, measurement results plotted in FIG. 9 were obtained. As can be seen from the current density-voltage curves plotted in FIG. 9, when $Ni_{1-x}Co_x$-SDC was used for the fuel electrode, the terminal voltage was 0.85 V or higher on any sample, and the power density increased with increasing amount of Co (x), the power density being the highest in the case of the fuel electrode of x=0.75, i.e., as high as about 160 $mW/cm^{-2}$, compared with the fuel electrode of x=0 (conventional nickel cermet with no cobalt) which achieved about 100 $mW/cm^{-2}$ at best.

[Comparison of Fuel Electrode Overvoltage (Proportional to Reaction Resistance) for Hydrogen]

Figure 10:
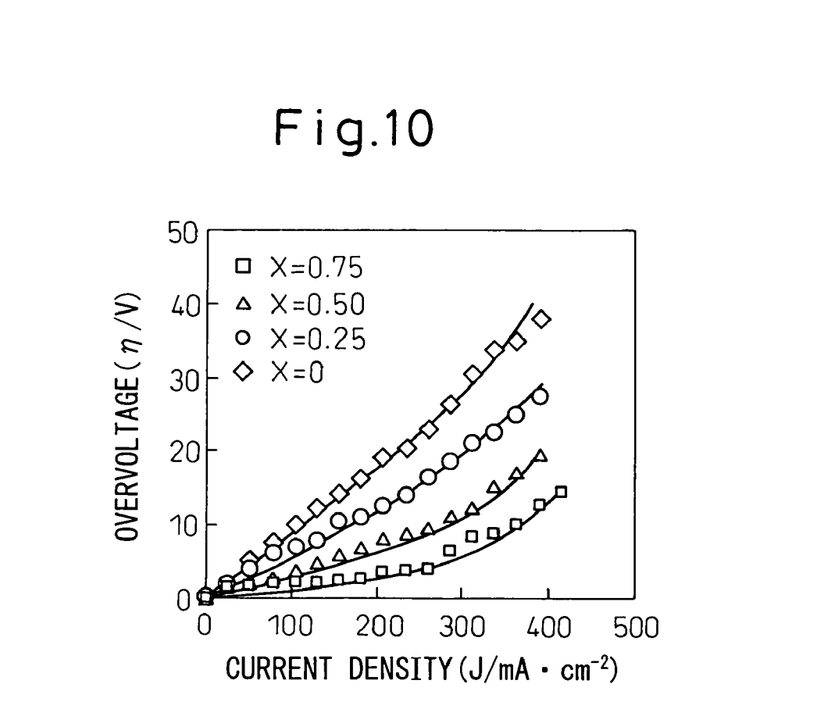
FIG. 10 is a graph showing a comparison of the overvoltage of fuel electrodes for hydrogen.

When overvoltage was measured on each fuel cell sample by a current interruption method while increasing the current density, measurement results plotted in FIG. 10 were obtained. As can be seen from the current density-overvoltage curves plotted in FIG. 10, when $Ni_{1-x}Co_x$-SDC was used for the fuel electrode, in any sample there is a tendency for the overvoltage to increase with increasing current density, but the overvoltage can be reduced by increasing the amount of Co (x).

[Evaluation of Adsorption Power by Temperature-Programmed Desorption (TPD) Analysis (1)]

Figure 11:
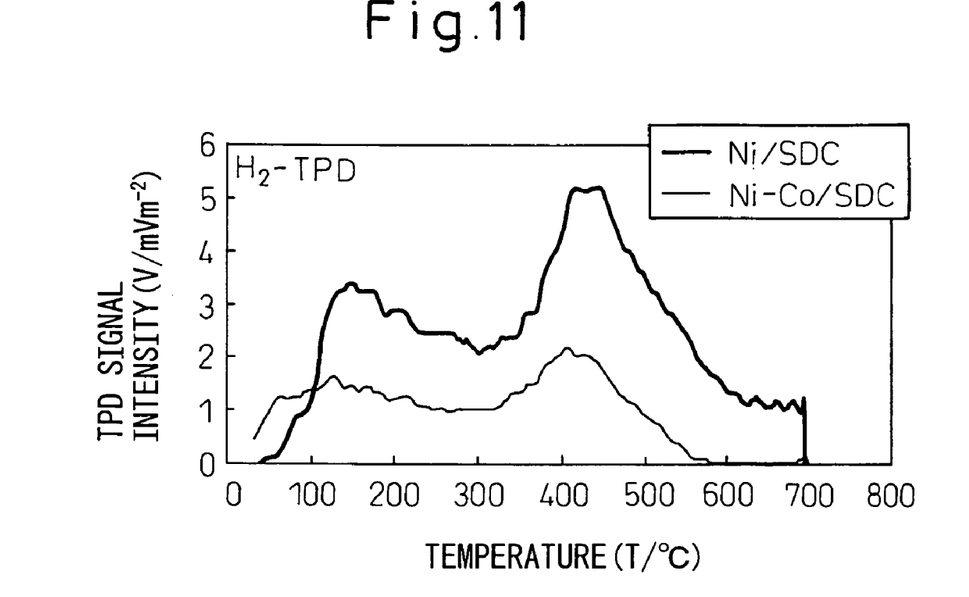
FIG. 11 is a TPD spectrum diagram of $Ni_{1-x}Co_x$-SDC particles of different compositions.

For $Ni_{1-x}Co_x$-SDC particles of different compositions (x=0 or 0.75), the adsorption ability when hydrogen was used as the fuel was evaluated by TPD (temperature-programmed desorption) analysis, and a TPD spectrum diagram plotted in FIG. 11 was obtained. As can be seen from the diagram, the signal intensity (mV) indicating the adsorption ability for hydrogen drops as a result of the increased amount of Co (x).

[Evaluation of Adsorption Power by Temperature-Programmed Desorption (TPD) Analysis (2)]

Figure 12:
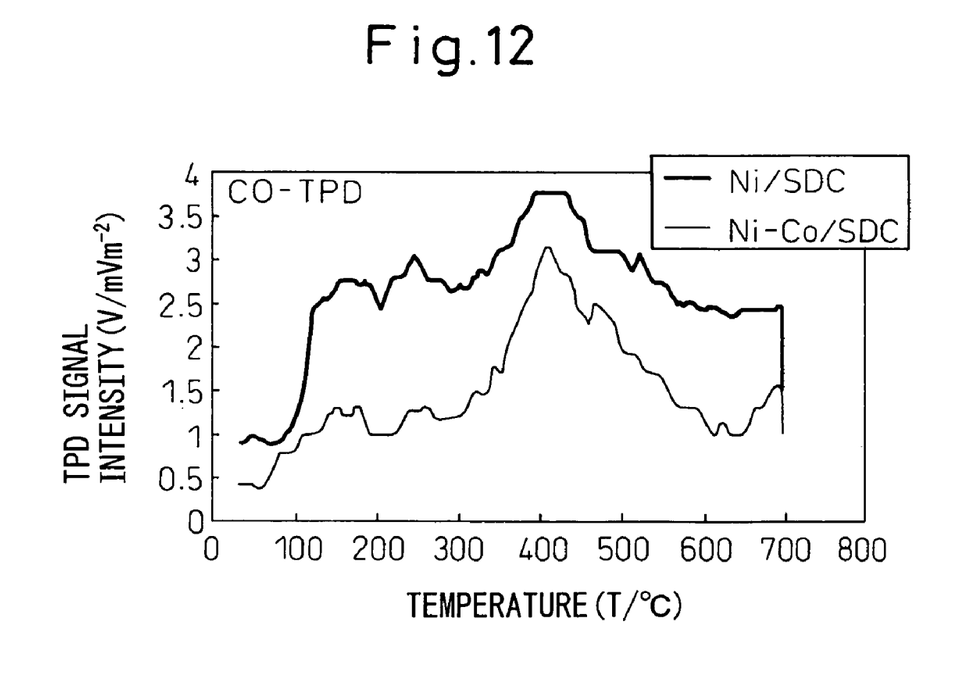
FIG. 12 is a TPD spectrum diagram of $Ni_{1-x}Co_x$-SDC particles of different compositions.

For $Ni_{1-x}Co_x$-SDC particles of different compositions (x=0 or 0.75), the adsorption ability when carbon monoxide was used as the fuel was evaluated by TPD (temperature-programmed desorption) analysis, and a TPD spectrum diagram plotted in FIG. 12 was obtained. As can be seen from the diagram, the signal intensity (mV) indicating the adsorption ability for carbon monoxide drops as a result of the increased amount of Co (x).

The invention claimed is:

1. A fuel cell electrode material comprising a cermet which comprises metal particles consisting of cobalt and nickel and electrolyte particles consisting of solid oxides, the electrolyte particles having a smaller particle size than the metal particles, wherein said metal particles comprise 20 to 90 mol % cobalt and the residue of nickel in terms of CoO and NiO, respectively, wherein said electrolyte particles comprise a samarium-doped ceria-based ceramic or a gadolinium-doped ceria-based ceramic, wherein when said cobalt and said nickel are in oxidized forms, CoO and NiO, respectively, in said cermet, said electrolyte particles are contained in an amount of 10 to 70% by weight based on the total amount of said cermet, and wherein said electrode material has an adsorption ability of the order of 0.1 to $10 \times 10^{-6}$ mol/m$^2$ for each of methane, carbon monoxide and hydrogen gases, when said adsorption ability for the gas is expressed by the formula: the number of adsorbed molecules (mol)/the unit area (m$^2$) of said cermet.

2. A fuel cell electrode material as claimed in claim 1, wherein said cobalt and said nickel are completely solid-solutioned in said cermet, at least under the reduced conditions.

3. A fuel cell electrode material as claimed in claim 1, wherein said electrode material is used in the form of a thin film.

4. A solid oxide fuel cell battery comprising a fuel cell which comprises a solid electrolyte base, a fuel electrode formed on a fuel compartment side of said base, and an air electrode formed on an air compartment side of said base, wherein said fuel electrode is formed from an electrode material as described in claim 1.

5. A fuel cell battery as claimed in claim 4, wherein said fuel cell is constructed from a single cell member or a combination of two or more cell members.

6. A fuel cell battery as claimed in claim 4, wherein said fuel cell battery is a direct-flame type fuel cell battery in which said fuel cell is placed so that said fuel electrode directly contacts a flame generated by the combustion of a solid fuel, a liquid fuel, or a gaseous fuel and generates electricity as a function of heat and fuel species in said flame.

7. A fuel cell battery as claimed in claim 4, wherein said fuel cell battery is a single-chamber type fuel cell battery in which said fuel cell is placed in an atmosphere of a fuel gas mixture consisting of a gaseous fuel and an oxygen or oxygen-containing gas, and generates electricity as a result of a potential difference caused between said fuel electrode and said air electrode.

8. A fuel cell battery as claimed in claim 4, wherein said fuel cell battery comprises a combination of two or more fuel cell battery units each functioning as a fuel cell battery.

* * * * *